(12) United States Patent
Prytz et al.

(10) Patent No.: US 9,277,417 B2
(45) Date of Patent: Mar. 1, 2016

(54) METHODS AND NODES FOR BALANCING LOAD ON CHANNELS

(71) Applicant: Telefonaktiebolaget L M Ericsson (publ), Stockholm (SE)

(72) Inventors: Mikael Prytz, Rönninge (SE); Tim Irnich, Neuss (DE); Jörgen Karlsson, Sundbyberg (SE); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/433,107

(22) PCT Filed: Oct. 11, 2012

(86) PCT No.: PCT/SE2012/051092
§ 371 (c)(1),
(2) Date: Apr. 2, 2015

(87) PCT Pub. No.: WO2014/058366
PCT Pub. Date: Apr. 17, 2014

(65) Prior Publication Data
US 2015/0223074 A1    Aug. 6, 2015

(51) Int. Cl.
*G01R 31/08* (2006.01)
*H04W 16/14* (2009.01)
(Continued)

(52) U.S. Cl.
CPC ............. *H04W 16/14* (2013.01); *H04L 47/125* (2013.01); *H04W 28/08* (2013.01); *H04W 72/0486* (2013.01); *H04W 72/06* (2013.01); *H04W 72/08* (2013.01)

(58) Field of Classification Search
CPC ..... H04W 16/00; H04W 16/14; H04W 28/00; H04W 28/08; H04W 72/00; H04W 72/04; H04W 72/0486; H04W 72/08; H04W 72/1252; H04L 47/00; H04L 47/125
See application file for complete search history.

(56) References Cited

U.S. PATENT DOCUMENTS 8,442,248 B2 * 5/2013 Solum .......................... 381/315
2010/0309806 A1 12/2010 Wu et al.
(Continued)

OTHER PUBLICATIONS

International Search Report for International application No. PCT/SE2012/051092, Aug. 23, 2013.
(Continued)

*Primary Examiner* — Anh Ngoc Nguyen
(74) *Attorney, Agent, or Firm* — Baker Botts, LLP (57) ABSTRACT

Methods and nodes for balancing load on channels available for secondary usage by a secondary network (404). A channel handling node (400) determines channel quality metric values for the available channels, which indicate expected utility when the channels are used for radio communication. The channel handling node then adjusts the channel quality metric value of a superior channel with higher expected utility than the other available channels, to indicate equal or lower expected utility than a channel with the next highest expected utility, when the amount of channel queries (Q) from the secondary network exceeds a limit. The channel handling node then returns the adjusted channel quality metric value of the at least one superior channel, in response to a subsequent channel query (Q). A secondary network node (406) of the secondary network that receives channel quality metric values for the available channels, including the adjusted channel quality metric value of the superior channel, can then select a channel for secondary usage based on the received channel quality metric values, and is thus influenced to select a channel other than the at least one superior channel.

27 Claims, 4 Drawing Sheets

(51) Int. Cl.
*H04W 72/04* (2009.01)
*H04W 72/06* (2009.01)
*H04W 72/08* (2009.01)
*H04L 12/803* (2013.01)
*H04W 28/08* (2009.01)

(56) References Cited

U.S. PATENT DOCUMENTS

2011/0111718 A1* 5/2011 Canpolat et al. ............. 455/255
2011/0194503 A1   8/2011 Stanforth
2011/0250916 A1  10/2011 Li et al.
2013/0128723 A1*  5/2013 Thibeault et al. ............. 370/225

OTHER PUBLICATIONS

PCT Written Opinion of the International Searching Authority for International application No. PCT2012/051092, Aug. 23, 2013.
IEEE Standard for Information Technology—Telecommunications and information exchange between systems; Wireless Regional Area Networks (WRAN)—Specific Requirements; Part 22: Cognitive Wireless RAN Medium Access Control (MAC) and Physical Layer (PHY) Specification: Policies and Procedures for Operation in the TV Bands; IEEE Standards Association (due to size, this reference has been split into four parts), Jul. 1, 2011.

* cited by examiner

METHODS AND NODES FOR BALANCING LOAD ON CHANNELS

PRIORITY

This nonprovisional application is a U.S. National Stage Filing under 35 U.S.C. §371 of International Patent Application Serial No. PCT/SE2012/051092 filed Oct. 11, 2012, and entitled "Methods and Nodes for Balancing Load On Channels".

TECHNICAL FIELD

The present disclosure relates to a channel handling node and a corresponding method, for balancing load on channels available for secondary usage by devices of a secondary network for radio communication in a specific geographical area. The disclosure also relates to a channel handling node and a corresponding method, for selecting a channel for secondary usage by the secondary network for radio communication in the geographical area.

BACKGROUND

In the field of radio communication involving wireless terminals and devices, procedures have been developed for a communication network of a so-called "secondary" service to use channels of a frequency spectrum originally allocated and reserved, e.g. by license or similar, for a "primary" service but not fully used by the primary service. In this context, the term "primary service" indicates a service or system, e.g. a TV broadcast service, which is exclusively authorized to use a reserved frequency spectrum for radio transmissions. However, the primary service may not always use all parts of the reserved frequency spectrum, e.g. in certain areas and/or during certain time periods. For example, a TV broadcast service may only broadcast between 6 and 11 p.m. every day. Thereby, the spectrum will be unused the remaining hours of the day and night. A primary service may further make radio transmissions on certain frequencies in a certain geographical area but not in other areas.

It is possible for a provider of the primary service to make an unused part of the licensed frequency spectrum available for use in a specific geographical area by a communication network that provides a secondary service. The term "secondary service" thus indicates a service or system, e.g. a cellular network for mobile communication, which is at least temporarily allowed to use the unused part of the licensed frequency spectrum for its own radio transmissions, e.g. between base stations and wireless terminals or devices, as long as they do not cause harmful interference to the primary service. The geographical areas where a reserved frequency spectrum is not in use have been commonly termed the "white space" for that frequency spectrum. In this description, the term "secondary usage" is used to indicate usage of channels of a frequency spectrum which are reserved for but not used by the primary service.

Motivated by the underutilization of e.g. the TV broadcast bands, the research community has during the last decade performed research into secondary usage of a frequency spectrum not used by a primary service. The goal is to utilize reserved but unused parts of the spectrum, e.g. the TV broadcast bands, for other radio transmissions in such a way that the primary service is not negatively affected by the secondary usage of available channels in the frequency spectrum.

The central idea behind secondary spectrum access is thus to use already reserved spectrum for secondary purposes, i.e., for radio communication in a mobile communication network. As an example, TV broadcast spectrum may be used for secondary purpose in the TV white spaces. Communication entities in the secondary network are sometimes referred to as White Space Devices WSDs, which thus transmit or receive radio signals on spectrum reserved for a primary service at times and/or locations where the primary service is not using the spectrum. As mentioned above, a WSD is not allowed to cause harmful interference to the primary service. Furthermore, the WSD is not protected from interference from any transmissions of the primary service.

Figure 1:
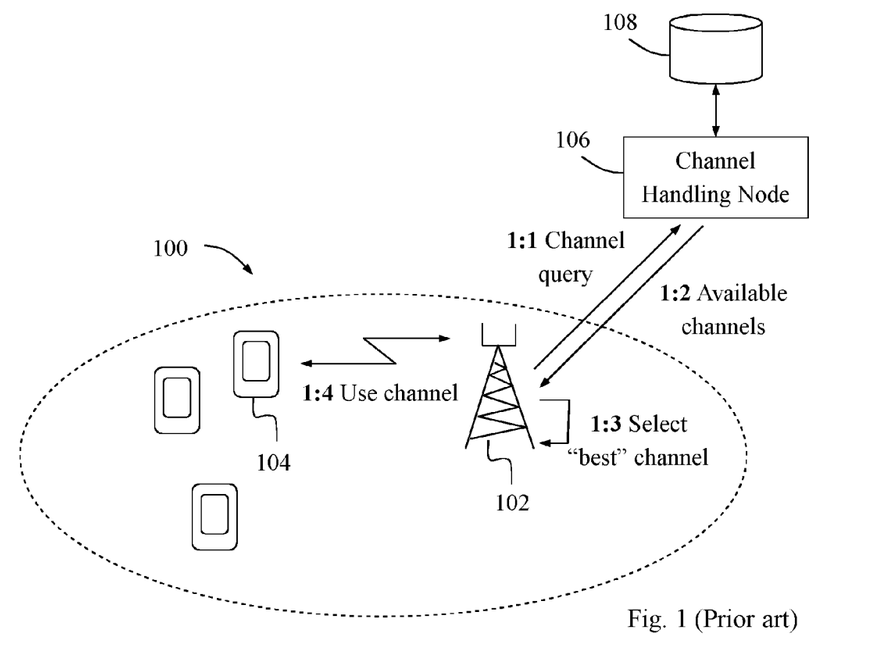
FIG. 1 is a communication scenario illustrating a process of channel selection for white space devices, according to the prior art.

A way of finding out which channels are available for secondary usage, is to access a centrally managed database referred to as a white space database, which is illustrated in FIG. 1. This figure illustrates a secondary network 100 in a specific geographical area comprising base stations 102 and wireless devices 104. A channel handling node 106 is associated with a white space database 108 which holds information on channels that are available for secondary usage by the secondary network 100. The channel handling node 106 is configured to return information about available channels taken from the white space database 108, in response to channel queries from the secondary network. In this process, the channel handling node 106 may retrieve the channel information by querying the white space database 108, either at each and every channel query or at regular intervals when the retrieved channel information is cached. It should be noted that more than one white space database may be associated with a channel handling node, possibly competing with each other.

Upon a query from a querying node of the secondary network, shown by an action 1:1, which querying node in this case is a base station 102, the channel handling node 106 returns a list of channels available for secondary usage, shown by another action 1:2. The base station 102 typically provides information in the query regarding its location.

Furthermore, the channel handling node 106 also returns maximum allowed transmit power levels associated with the channels available for secondary usage in the response 1:2 to base station 102. These transmit power levels have been determined based on an estimation of how much interference that would be generated by the secondary usage in a worst case, possibly including a margin to take into account the added interference from multiple communications. As a result, all querying nodes can identify the most attractive channel based on its maximum allowed transmit power level. The base station then selects one or more of the returned channels, in an action 1:3, and uses the selected channel for radio communication with a wireless terminal 104, in a final shown action 1:4.

However, it is a problem that the load on channels available for secondary usage by a secondary network for radio communication, can sometimes be uneven such that one or more of the most attractive channels are selected very often for secondary usage and therefore get overloaded while other channels are left more or less unused. The resulting load distribution on the available channels will thus be uneven and the utilization of available channels is not efficient.

SUMMARY

It is an object of embodiments described herein to address at least some of the problems and issues outlined above. It is for example an object to enable distribution of the load on channels that are available for secondary usage by devices of a secondary network in a certain area, and it may be desirable to avoid that just one or a few of the available channels are used by many devices simultaneously. It is possible to achieve these objects and others by using a method and a channel handling node as defined in the attached independent claims.

According to one aspect, a method is provided in a channel handling node associated with a white space database, for balancing load on channels available for secondary usage by a secondary network for radio communication in a specific geographical area. The channel handling node is configured to return information about available channels in response to channel queries from the secondary network.

In this method, the channel handling node determines values of a channel quality metric for the available channels, the values indicating expected utility when the channels are used for radio communication in the geographical area. The channel handling node then adjusts the determined channel quality metric value of at least one superior channel having a channel quality metric value that indicates higher expected utility than the channel quality metric values of the other available channels, to indicate equal or lower expected utility of the at least one superior channel than a channel of the other available channels having the next highest expected utility, when the amount of channel queries received from the secondary network during a given time span exceeds a first limit.

The channel handling node also returns the adjusted channel quality metric value of the at least one superior channel, in response to at least one subsequent channel query from the secondary network, thereby influencing the secondary network to select a channel other than the at least one superior channel for radio communication to balance the load on the available channels.

According to another aspect, a channel handling node is provided which node is associated with a white space database and configured to balance load on channels available for secondary usage by a secondary network for radio communication in a specific geographical area. The channel handling node is also configured to return information about available channels in response to channel queries from the secondary network.

The channel handling node comprises a determining unit adapted to determine values of a channel quality metric for the available channels, the values indicating expected utility when the channels are used for radio communication in the geographical area. The channel handling node also comprises a logic unit adapted to adjust the determined channel quality metric value of at least one superior channel having a channel quality metric value that indicates higher expected utility than the channel quality metric values of the other available channels, to indicate equal or lower expected utility of the at least one superior channel than a channel of the other available channels having the next highest expected utility, when the amount of channel queries received from the secondary network during a given time span exceeds a first limit.

The channel handling node further comprises a communication unit adapted to return the adjusted channel quality metric value of the at least one superior channel, in response to at least one subsequent channel query from the secondary network. Thereby, the secondary network can be influenced to select a channel other than the at least one superior channel for radio communication to balance the load on the available channels.

According to another aspect, a method is provided in a secondary network node of a secondary network, for selecting a channel for secondary usage by the secondary network for radio communication in a specific geographical area. In this method, the secondary network node receives values of a channel quality metric for the available channels from a channel handling node in response to a channel query. The channel quality metric values indicate expected utility when the channels are used for radio communication in the geographical area. In the received channel quality metric values, the channel quality metric value of at least one superior channel having a channel quality metric value that indicates higher expected utility than the channel quality metric values of the other available channels, has been adjusted by the channel handling node to indicate equal or lower expected utility of the at least one superior channel than a channel of the other available channels having the next highest expected utility when the amount of channel queries from the secondary network during a given time span exceeds a first limit.

The secondary network node then selects a channel for secondary usage by the secondary network based on the received channel quality metric values of the available channels. When using the above methods and nodes, the secondary network node will be influenced to select a channel other than the at least one superior channel for radio communication, such that the load on the available channels can be balanced over other channels to avoid overload on the at least one superior channel.

According to another aspect, a channel handling node is provided which node is configured for selecting a channel for secondary usage by the secondary network for radio communication in a specific geographical area. The secondary network node comprises a receiving unit adapted to receive values of a channel quality metric for the available channels from a channel handling node in response to a channel query. The received channel quality metric values indicate expected utility when the channels are used for radio communication in the geographical area The channel quality metric value of at least one superior channel having a channel quality metric value that indicates higher expected utility than the channel quality metric values of the other available channels, has been adjusted by the channel handling node to indicate equal or lower expected utility of the at least one superior channel than a channel of the other available channels having the next highest expected utility when the amount of channel queries from the secondary network during a given time span exceeds a first limit.

The secondary network node also comprises a selecting unit adapted to select a channel for secondary usage by the secondary network based on the received channel quality metric values of the available channels.

When using any of the above methods and nodes, the secondary network can be influenced to select a channel other than the at least one superior channel for radio communication, such that the load on the available channels can be balanced over other channels to avoid overload on the at least one superior channel.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable a better distribution of load on channels available for secondary usage by a secondary network for radio communication in a specific geographical area. These channels belong to a frequency spectrum which has been reserved for a primary service but can be used by the secondary network. The solution is to be used particularly at times when many channel queries are received from the secondary network and when one or more channels would normally appear to be more attractive than others to select for the secondary usage which could cause overload on such attractive channels. This can be accomplished by adjusting a channel quality metric value of at least one superior channel, indicating the highest expected utility, to indicate equal or lower expected utility than the channel having the next highest expected utility. This is performed in a situation where there is a risk for overload on the most attractive channels, more specifically when the amount of channel queries received from the secondary network during a given time span is great and exceeds a first limit.

In this solution, it has been recognized that a particular channel having e.g. the highest maximum allowed transmit power level compared to all the other available channels, will appear as the most attractive channel to select for secondary usage, since transmit power means that the communication can be of high quality, e.g. due to high throughput, good signal quality, low amount of bit errors, no need for retransmissions, and so forth. As a result, when using a conventional procedure, all querying nodes can identify the most attractive, or "best", channel based on its maximum allowed transmit power level and select that particular channel for secondary usage, while none of the querying nodes will select one of the other channels.

This means that many wireless terminals need to share the same selected channel, leaving a very limited fraction of bandwidth resources to each individual terminal. Thereby, the most attractive channel will be overloaded while the other channels may be left more or less unused, which is a drawback associated with prior known conventional solutions. This situation is naturally unfavorable and undesirable, particularly during periods and in areas with dense traffic, due to the uneven load distribution and inefficient use of the available channels. Such undesirable overload on the "best" channel(s) can be avoided or at least reduced when using any of the embodiments described below by influencing the secondary network to select also other channels that may well be "good enough" for communication.

In this description, the term "superior channel" is used to represent a channel having a channel quality metric value that indicates higher expected utility than the channel quality metric values of the other available channels. There may be more than one superior channel, i.e. at least one, having basically the same highest expected utility. Further, the term "expected utility" refers to how useful or "good" the channel is expected to be for radio communication, and this property or characteristic is thus indicated by the above channel quality metric value. The channel quality metric may be a suitable and measurable quality-related parameter such as one or more of: a maximum allowed transmit power, expected Signal to Interference and Noise Ratio SINR, expected Signal to Noise Ratio SNR, expected Bit Error Rate BER, expected Symbol Error Rate SER and expected Block Error Rate BLER, although the solution is not limited to these examples.

It should be noted that either a high or a low value of the channel quality metric may indicate high expected utility, depending on which quality-related parameter is used to determine the channel quality metric value. Thus, high expected utility is indicated by a high value of maximum allowed transmit power, by a high value of SINR, and by a low value of BLER. The channel quality metric used in this solution may further be calculated from one or more of the above quality-related parameters, and may be expressed as a classification or rating, e.g. in terms like "low", medium", "high", or "poor", "acceptable", "good", etc., determined based on one or more of the above quality-related parameters.

A possible example of a procedure or method for balancing load on channels available for secondary usage by a secondary network, will now be described with reference to the flow chart in FIG. 2. These channels have been reserved for a primary service and are thus available for radio communication by the secondary network in a specific geographical area. The actions in this figure are performed by a channel handling node which is associated with a white space database in which information about the available channels is maintained. In this context, the channel handling node may be associated with just one white space database or with several white space databases, possibly competing with each other, as in the scenario described above for FIG. 1. The term "a white space database" in this description should thus not exclude the possibility that the channel handling node is associated with more than one white space database. However, only one white space database will be involved in the following description for simplicity.

The channel handling node has the task of returning information about available channels in response to channel queries from the secondary network. The channel queries may be received from various "querying nodes" in the secondary network such as a network management node, base stations and wireless devices served by the secondary network. In a first shown action 200, the channel handling node determines values of a channel quality metric for the available channels, where the values indicate expected utility when the channels are used for radio communication in the geographical area. The term "expected utility" has been explained above.

According to some possible embodiments, the channel handling node may determine these channel quality metric values e.g. by querying the white space database for information about the available channels and then get identifications of the available channels along with their respective channel quality metric values. Such queries to the white space database may be made whenever the channel handling node receives a channel query from the secondary network. Alternatively, the channel handling node may obtain this information from the white space database according to other possible schemes, e.g. at predefined intervals, by query or automatically, wherein the obtained information is cached in a cache memory at the channel handling node for retrieval when receiving channel queries from the secondary network. It should be noted that the available channels and their channel quality metric values may change over time, e.g. due to changing availability, changing radio conditions, and activities by the primary service, and this information should therefore be updated from time to time, e.g. according to a specific updating scheme.

Having determined the channel quality metric values for the available channels, the channel handling node is able to find out which channel has the highest expected utility among the available channels, as indicated by their original "true" channel quality metric values. This channel is thus denoted the "superior channel" in this disclosure which would appear to be the best channel if its original channel quality metric value is returned unadjusted to the secondary network. As mentioned above, there may be more than one superior channel having basically the same expected utility, hence the term "at least one superior channel".

The at least one superior channel has a channel quality metric value that indicates higher expected utility than the channel quality metric values of the other available channels. A next action 202 illustrates that when the amount of channel queries received from the secondary network during a given time span exceeds a first limit, the channel handling node adjusts the channel quality metric value of the at least one superior channel, such that the adjusted value indicates equal or lower expected utility of the at least one superior channel than a channel of the other available channels having the next highest expected utility.

For example, if the channel quality metric is the maximum allowed transmit power or expected SINR the channel quality metric value can be reduced, while if the channel quality metric is expected BLER the channel quality metric value can be increased in this action. In this way, the channel quality metric value of the superior channel is somewhat "tweaked" such that this channel will no longer appear to be the most attractive channel for the secondary network to select for usage. It should be noted that the channel quality metric value may be dependent on the position for communication within the given geographical area since radio conditions are typically different in different locations.

Another action 204 illustrates that the channel handling node returns the adjusted channel quality metric value of the at least one superior channel, in response to at least one subsequent channel query from the secondary network. The channel handling node may also return the channel quality metric values of the remaining available channels, which have not been adjusted, so that the secondary network is able to choose one of the channels for usage in radio communication based on their channel quality metric values given in the response returned from the channel handling node.

Thereby, the secondary network, i.e. one or more querying nodes therein, will be influenced to select a channel other than the at least one superior channel for radio communication to balance the load on the available channels, since the at least one superior channel does not appear to be the best channel on the basis of the returned adjusted channel quality metric value. Further, the channel handling node may also return an indicator with the adjusted channel quality metric value to indicate that this value has been adjusted, in order to add transparency. For example, the secondary network may want to avoid using a channel that has a "tweaked" value. The querying node in the secondary network will more likely select a channel with the apparently highest expected utility which will not always be the superior channel thanks to the above adjustment of its channel quality metric value.

According to another possible embodiment, the channel handling node may return both the determined "true" i.e. non-adjusted channel quality metric value and the adjusted channel quality metric value of the same channel to the secondly network. Thereby, the secondary network is enabled to interpret the difference between the returned two types of metric values for the same channel. It may have been predefined that the first channel quality metric value of a channel indicates the actual or true channel quality of a channel, whereas the second channel quality metric value of that channel indicates an adjusted channel quality of the same channel. Such reporting of two channel quality metrics will enable the secondary network to determine the amount of adjustment applied to the actual channel quality. This will enable the secondary network to decide whether to use the channel for radio communication or not. For example, if the difference between the two channel quality metrics of the same channel is above a threshold, then the secondary network may decide not to use the channel.

According to yet another possible embodiment, the channel handling node may return the determined actual channel quality metric value and a relative quality metric value wherein the relative quality metric value is calculated by using a function of the determined non-adjusted channel quality metric value and the adjusted channel quality metric value of the same channel. The function used for obtaining the relative channel quality metric value may be preconfigured. An example of this function is a difference between the non-adjusted channel quality metric value and the adjusted channel quality metric value of the same channel. Yet another example of the function for determining a relative channel quality metric value is a ratio of the determined channel quality metric value to the adjusted channel quality metric value of the same channel. The relative or differential reporting according to the above examples may be used to reduce signaling overheads.

The adjusted channel quality metric value may be valid and used for a certain time of day, week or season, e.g. at times with high traffic load in the secondary network. Further, the adjusted channel quality metric value may be location-specific, i.e. valid for a certain location, depending on a location given in the at least one subsequent channel query e.g. a location with high traffic load in the secondary network. On the other hand, the channel quality metric value may not be adjusted for a superior channel and returned as is, in response to a channel query providing another location e.g. with less traffic load. As mentioned above, the original channel quality metric values may also be dependent on the position for communication due to different radio conditions.

It may be helpful to apply the above procedure of returning an adjusted channel quality metric value for a limited time span or for a limited amount of channel queries, and after that return the original unadjusted channel quality metric value of the superior channel, to avoid excessive load on the channel having the next highest expected utility instead. It is also possible to adjust the channel quality metric value for a set of superior channels, e.g. the two, three, four, etc., "best" channels in terms of expected utility, all having higher expected utility than the remaining channels but not necessarily having the same expected utility.

Further, the current usage of a channel may be monitored and taken into consideration for deciding whether to adjust the channel quality metric for a specific channel, out of the available channels, based on the number of active wireless devices currently using that channel. The channel quality metric of the specific channel may be adjusted when the number of active wireless devices using this specific channel exceeds a second limit, which will be described further below with reference to the flow chart in FIG. 3 comprising actions performed by a channel handling node according to another more detailed example. Just as in the example of FIG. 2, the channel handling node is associated with a white space database in which information about channels available for secondary usage is maintained, and has the task of returning information about available channels in response to channel queries from a secondary network.

A first action 300 illustrates that the channel handling node determines values of a channel quality metric for the available channels, where the values indicate expected utility when the channels are used for radio communication in a certain geographical area. This action thus corresponds to action 200 in FIG. 2. Another action 302 illustrates that the channel handling node registers the amount of channel queries received from the secondary network i.e. from querying nodes therein, within a certain time span which can be selected freely, e.g. in the order of minutes or hours, without limitation. Such channel queries may be communicated e.g. by means of a known protocol called IETF PAWS.

It is then determined in an action 304 whether the registered amount of channel queries exceeds a first limit. This limit is configurable and may have been set as the amount of channel queries over which there is a risk for excessive load on the superior channel(s) that could degrade the performance of the channel, e.g. by providing a limited fraction of bandwidth resources to each communication over that channel. If the amount of channel queries exceeds the first limit, the channel handling node identifies at least one superior channel in a following action 306, which may be made in a manner already explained above in connection with action 200 in FIG. 2.

The channel handling node then adjusts the channel quality metric value of the at least one superior channel, in a following action 308, such that the adjusted value indicates equal or lower expected utility of the at least one superior channel than a channel of the other available channels having the next highest expected utility. This action corresponds to action 202 in FIG. 2. The "next highest" expected utility implies a channel which has a channel quality metric value that indicates that the channel is the one expected to provide the best utility among the remaining available channels apart from the identified at least one superior channel. For example, if several superior channels with different levels of expected utility are identified in action 306, the next highest expected utility of a channel would be on a level next below the levels of expected utility of the superior channels. If the amount of channel queries does not exceed the first limit in action 304, actions 306 and 308 are omitted as shown in the figure.

Figure 2:
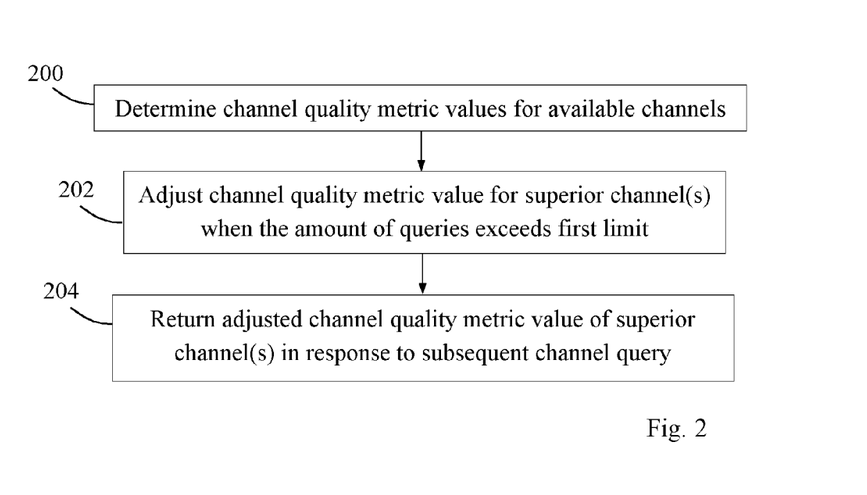
FIG. 2 is a flow chart illustrating a procedure in a channel handling node, according to some possible embodiments.
Figure 3:
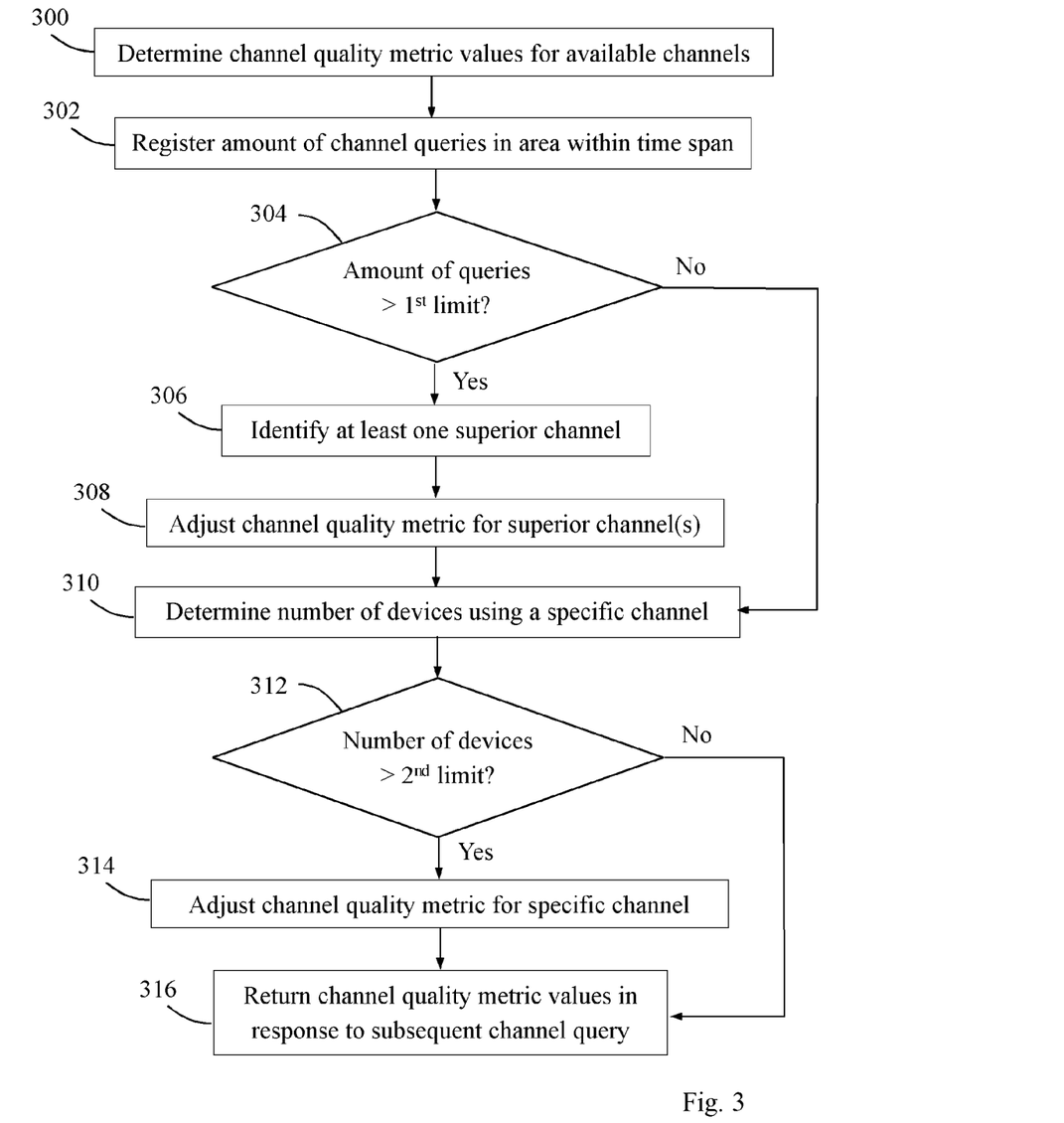
FIG. 3 is a flow chart illustrating an example of a more detailed procedure in a channel handling node, according to further possible embodiments.

So far, the procedure in FIG. 3 is similar to the actions 200 and 202 of FIG. 2, although explaining in more detail how this may be done in practice. A further action 310 illustrates that the channel handling node also determines the number or amount of wireless devices that are currently using a specific channel, which thus indicates the current load on that channel. The "specific" channel in this context may be a superior channel according to the above definition, or it could be any other channel among the available channels that needs to be checked. The number of active wireless devices using the specific channel may be determined based on feedback from the wireless devices regarding channel usage, or possibly by querying a suitable node in the secondary network, e.g. a network management node, or a base station among others.

A secondary network may apply different criteria for selecting a channel for communication, such as selecting the best one in terms of expected utility, among all the available channels. Another possibility is that the secondary network selects a channel using a minimum requirement as criteria, and therefore selects the first channel in a list of available channels that fulfills a minimum requirement. From this it could be possible that a specific channel, not being the superior channel, may be currently loaded by a great number of devices, and it may therefore be desirable also to reduce its channel quality metric value to relieve the load on the specific channel.

A next action 312 illustrates that the channel handling node determines whether the number of active wireless devices using the specific channel exceeds a second limit. As similar to the first limit, the second limit may have been set as the number of active wireless devices over which there is a risk for excessive load on the specific channel that could degrade the performance of that channel. If the number of active wireless devices on the specific channel exceeds the second limit, the channel quality metric value of the specific channel is adjusted to indicate lower expected utility, in another action 314.

A final action 316 illustrates that the channel handling node returns the channel quality metric values of the available channels, including one or more values that have been adjusted in any of actions 308 and 314, in response to at least one subsequent channel query from the secondary network. If the number of active wireless devices using the specific channel does not exceed the second limit in action 312, action 314 is omitted as shown in the figure. This may be checked for any number of channels in the above-described manner. Any such responses to channel queries may be communicated e.g. by means of the above-mentioned IETF PAWS protocol.

Figure 4:
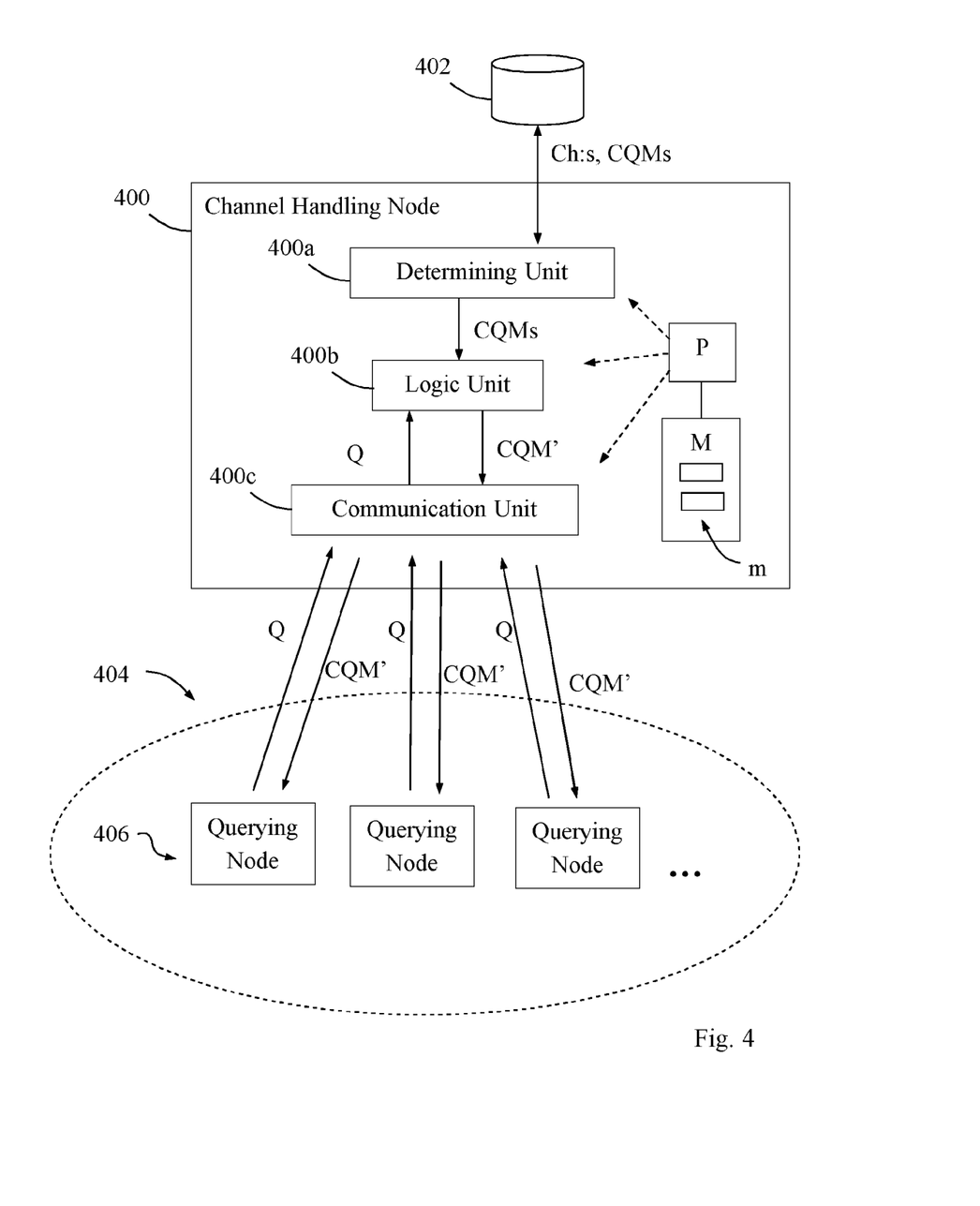
FIG. 4 is a block diagram illustrating a channel handling node in more detail, according to further possible embodiments.

A detailed but non-limiting example of how a channel handling node can be made to accomplish the above-described embodiments is illustrated by the block diagram in FIG. 4. The channel handling node 400 is associated with a white space database 402 and is configured to return information about channels "Ch:s" available for secondary usage, in response to channel queries "Q" from a secondary network 404. The channel handling node 400 is further configured to balance load on the channels which are available for secondary usage by the secondary network 404 for radio communication in a specific geographical area, e.g. according to any of the procedures described above for FIGS. 2 and 3, respectively. The secondary network 404 may comprise one or more querying nodes 406 from which the channel queries Q are received, as shown in the figure, including any of: a network management node, a base station and a wireless device.

The channel handling node 400 comprises a determining unit 400a adapted to determine values of a channel quality metric for the available channels, denoted "CQMs", which values indicate expected utility when the channels are used for radio communication in the secondary network 404. The channel handling node 400 also comprises a logic unit 400b. When the amount of channel queries Q received from the secondary network 404 during a given time span exceeds a first limit, the logic unit 400b is adapted to adjust the channel quality metric value of at least one superior channel having a channel quality metric value that indicates higher expected utility than the channel quality metric values of the other available channels, such that the adjusted channel quality metric value CQM' indicates equal or lower expected utility of the at least one superior channel than a channel of the other available channels having the next highest expected utility. The terms "expected utility" and "the next highest expected utility" have been explained above.

The channel handling node 400 also comprises a communication unit 400c which is adapted to return the adjusted channel quality metric value CQM' of the at least one superior channel, in response to at least one subsequent channel query Q from the secondary network. Thereby, the secondary network 404 is influenced to select a channel other than the at least one superior channel for radio communication to balance the load on the available channels.

The above channel handling node 400 and its functional units 400a-c may be configured or adapted to operate according to various optional embodiments. In some possible embodiments, the channel quality metric may relate to at least one of: a maximum allowed transmit power, expected Signal to Interference and Noise Ratio SINR, expected Signal to Noise Ratio SNR, expected Bit Error Rate BER, expected Symbol Error Rate SER, and expected Block Error Rate BLER. A few examples of channel quality metrics that may be used in this context have been described above.

In another possible embodiment, the logic unit 400b may be further adapted to adjust the channel quality metric value to a location-specific value depending on a location given in the at least one subsequent channel query. In other possible embodiments, the adjusted channel quality metric value may be valid for a certain time of day, week or season. In yet another possible embodiment, the communication unit 400c may be further adapted to receive the at least one subsequent channel query from various querying nodes 406 which could include any of: a network management node, a base station and a wireless device in the secondary network.

In some further alternative embodiments, the communication unit 400c may be adapted to return an indicator with the adjusted channel quality metric value to indicate that this value has been adjusted. In another alternative, the communication unit 400c may be adapted to return the determined channel quality metric value of the at least one superior channel with the adjusted channel quality metric value of the same channel. In another alternative, the communication unit 400c may be adapted to return the determined channel quality metric value of the at least one superior channel with a relative quality metric value calculated by using a function of the determined channel quality metric value and the adjusted channel quality metric value of the same channel.

In other possible embodiments, the logic unit 400b may be further adapted to adjust the channel quality metric value of a specific channel, out of the available channels, based on the number of active wireless devices currently using that channel. In that case, the logic unit 400b may be adapted to adjust the channel quality metric value of the specific channel to indicate lower expected utility when the number of active wireless devices using this specific channel exceeds a second limit. It has been described above how this can be done in more detail in connection with actions 310-314 in FIG. 3. The number of active wireless devices using the specific channel may be determined based on feedback from the wireless devices regarding channel usage. In yet another possible embodiment, the determining unit 400a may be further adapted to update the obtained channel quality metric values of the available channels according to an updating scheme.

It should be noted that FIG. 4 illustrates various functional units in the channel handling node 400 and the skilled person is able to implement these functional units in practice using suitable software and hardware. Thus, the solution is generally not limited to the shown structures of the channel handling node 400, and the functional units 400a-c may be configured to operate according to any of the features described in this disclosure, where appropriate.

The functional units 400a-c described above can be implemented in the channel handling node 400 by means of program modules of a respective computer program comprising code means which, when run by a processor "P" causes the channel handling node 400 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the channel handling node 400 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the channel handling node 400.

By using any of the above examples of adjusting the channel quality metric value of a channel, the channel handling node is able to influence the choice of channels in the secondary network so as to balance the load properly over the available channels. Thereby, the utilization of the available channels can be made more efficient or even optimal.

Figure 5:
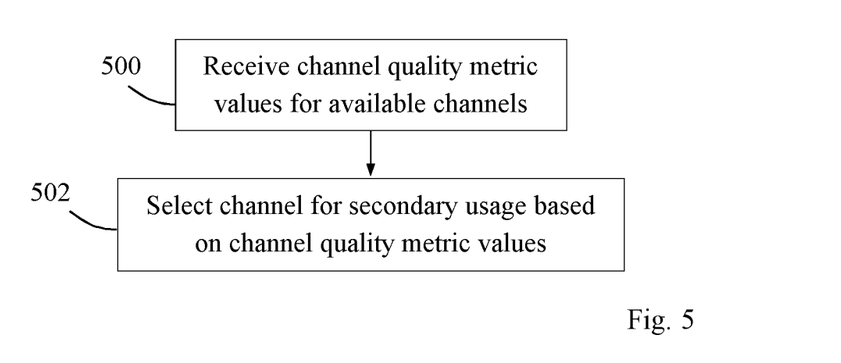
FIG. 5 is a flow chart illustrating a procedure in a secondary network node, according to further possible embodiments.

Another possible example of a procedure for selecting a channel for secondary usage by the secondary network for radio communication in a specific geographical area, will now be described with reference to the flow chart in FIG. 5. As in the above examples, it is assumed that channels that have been reserved for a primary service are made available to the secondary network for radio communication in the specific geographical area. The actions shown in this figure can be performed by a secondary network node of the secondary network when in communication with a channel handling node such as the node 400 described above. The "secondary network node" may be any of the querying nodes mentioned in the above examples, e.g. a network management node, a base station or a wireless device.

In a first action 500 of this procedure, the secondary network node receives values of a channel quality metric for the available channels from the channel handling node in response to a channel query which the channel handling node has received from the secondary network node. The received channel quality metric values indicate expected utility when the channels are used for radio communication in the geographical area. As in the previous examples, the channel quality metric value of at least one superior channel having a channel quality metric value that indicates higher expected utility than the channel quality metric values of the other available channels, has been adjusted by the channel handling node to indicate equal or lower expected utility of the at least one superior channel than a channel of the other available channels having the next highest expected utility. This adjustment has been made when the amount of channel queries from the secondary network during a given time span exceeds a first limit.

In another action 502, the secondary network node selects a channel for secondary usage by the secondary network based on the received channel quality metric values of the available channels. As a result, the secondary network node of the secondary network is likely influenced to select a channel other than the at least one superior channel for radio communication, thereby balancing the load on the available channels.

Figure 6:
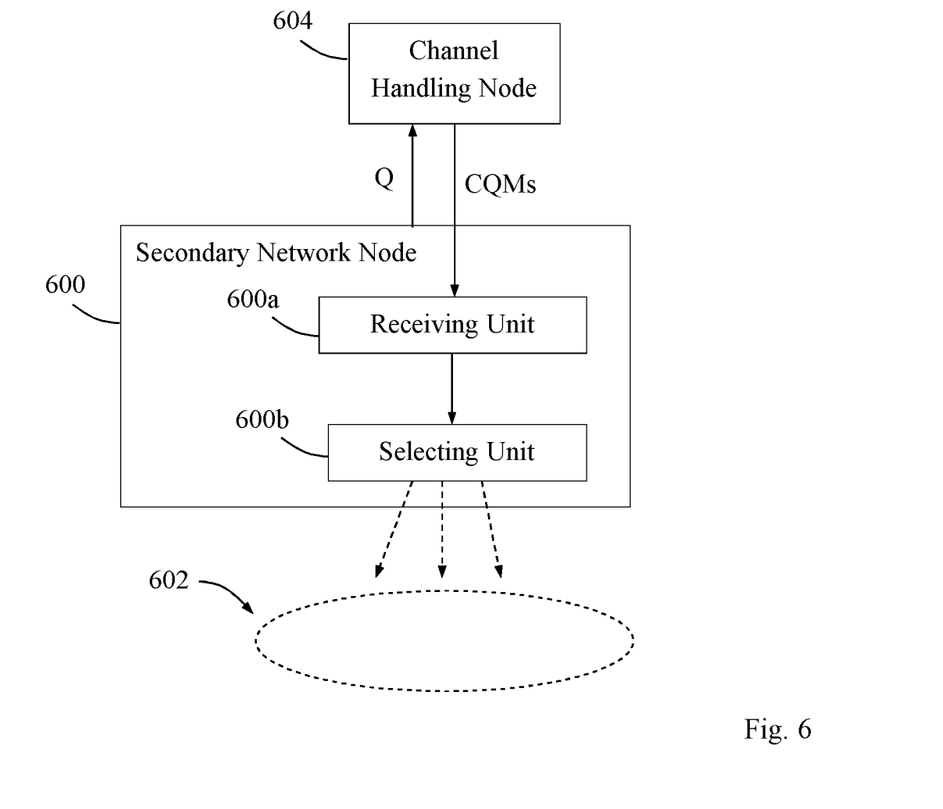
FIG. 6 is a block diagram illustrating a secondary network node in more detail, according to further possible embodiments.

A detailed but non-limiting example of how a secondary network node can be made to accomplish the above-described features is illustrated by the block diagram in FIG. 6. The secondary network node 600 thus belongs to a schematically illustrated secondary network 602, and is configured for selecting a channel for secondary usage by the secondary network for radio communication in a specific geographical area.

The secondary network node 600 comprises a receiving unit 600a adapted to receive values of a channel quality metric for the available channels from a channel handling node 604 in response to a channel query Q. The channel quality metric values indicate expected utility when the channels are used for radio communication in the geographical area. Of these received channel quality metric values, the channel quality metric value of at least one superior channel having a channel quality metric value that indicates higher expected utility than the channel quality metric values of the other available channels, has been adjusted by the channel handling node to indicate equal or lower expected utility of the at least one superior channel than a channel of the other available channels having the next highest expected utility when the amount of channel queries from the secondary network during a given time span exceeds a first limit.

The secondary network node 600 also comprises a selecting unit 600b adapted to select a channel for secondary usage by the secondary network based on the received channel quality metric values of the available channels, basically in the manner described above for action 502.

The above method and secondary network node 600 and its functional units 600a-b may be configured or adapted to operate according to various optional embodiments. In an optional embodiment, the secondary network node 600 receives an indicator with the adjusted channel quality metric value, which indicator indicates that the value has been adjusted. In that case, the selecting unit may be adapted to select a channel for secondary usage further based on the indicator, which has been further described above. In another optional embodiment, the secondary network node 600 receives a non-adjusted channel quality metric value of the at least one superior channel with the adjusted channel quality metric value of the same channel. In that case, the selecting unit may be adapted to select a channel for secondary usage further based on the non-adjusted channel quality metric value. The above two optional embodiments will thus add transparency which enables the secondary network node to determine the amount of adjustment applied to the actual channel quality. The secondary network node is thus able to decide whether to use the channel for radio communication or not.

In yet another optional embodiment, the secondary network node 600 receives a non-adjusted channel quality metric value of the at least one superior channel with a relative quality metric value calculated by using a function of the determined channel quality metric value and the adjusted channel quality metric value of the same channel. In that case, the selecting unit may be further adapted to select a channel for secondary usage further based on the relative quality metric value. The sending of a relative quality metric value or adjusted and non-adjusted channel quality metric values according to the above examples may be used to reduce signaling overheads.

While the solution has been described with reference to specific possible embodiments, the description is generally only intended to illustrate the inventive concept and should not be taken as limiting the scope of the solution. For example, the terms "channel handling node", "white space database", "primary service", "secondary network", "channel quality metric", "secondary network node", and "expected utility", have been used throughout this description, although any other corresponding entities, functions, and/or parameters could also be used having the features and characteristics described here. The solution and possible embodiments are defined by the appended claims.

The invention claimed is:

1. A method in a channel handling node associated with a white space database, for balancing load on channels available for secondary usage by a secondary network for radio communication in a specific geographical area, wherein the channel handling node returns information about available channels in response to channel queries from the secondary network, the method comprising:

determining values of a channel quality metric for the available channels, the values indicating expected utility when the channels are used for radio communication in the geographical area, characterized in that the method further comprises:

adjusting the determined channel quality metric value of at least one superior channel having a channel quality metric value that indicates higher expected utility than the channel quality metric values of the other available channels, to indicate equal or lower expected utility of the at least one superior channel than a channel of the other available channels having the next highest expected utility, when the amount of channel queries received from the secondary network during a given time span exceeds a first limit, and returning the adjusted channel quality metric value of the at least one superior channel, in response to at least one subsequent channel query from the secondary network, thereby influencing the secondary network to select a channel other than the at least one superior channel for radio communication to balance the load on the available channels.

2. The method according to claim 1, wherein the channel quality metric relates to at least one of: a maximum allowed transmit power, expected Signal to Interference and Noise Ratio SINR, expected Signal to Noise Ratio SNR, expected Bit Error Rate BER, expected Symbol Error Rate SER, and expected Block Error Rate BLER.

3. The method according to claim 1, wherein the adjusted channel quality metric value is location-specific depending on a location given in the at least one subsequent channel query.

4. The method according to claim 3, wherein different adjusted channel quality metric values of the at least one superior channel are returned wherein the different adjusted channel quality metric values are valid for different locations in the geographical area.

5. The method according to claim 1, wherein the adjusted channel quality metric value is valid for a certain time of day, week or season.

6. The method according to claim 1, wherein the at least one subsequent channel query from the secondary network is received from any of: a network management node, a base station and a wireless device.

7. The method according to claim 1, wherein an indicator is returned with the adjusted channel quality metric value to indicate that the value has been adjusted.

8. The method according to claim 1, wherein the determined channel quality metric value of the at least one superior channel is returned with the adjusted channel quality metric value of the same channel.

9. The method according to claim 1, wherein the determined channel quality metric value of the at least one superior channel is returned with a relative quality metric value calculated by using a function of the determined channel quality metric value and the adjusted channel quality metric value of the same channel.

10. The method according to claim 1, wherein the channel quality metric value of a specific channel, out of the available channels, is adjusted based on the number of active wireless devices currently using that channel.

11. A channel handling node associated with a white space database, wherein the channel handling node is configured to balance load on channels available for secondary usage by a secondary network for radio communication in a specific geographical area, and further configured to return information about available channels in response to channel queries from the secondary network, the channel handling node comprising:
   a determining unit that determines values of a channel quality metric for the available channels, the values indicating expected utility when the channels are used for radio communication in the geographical area,
   characterized in that the channel handling node further comprises:
      a logic unit that adjusts the determined channel quality metric value of at least one superior channel having a channel quality metric value that indicates higher expected utility than the channel quality metric values of the other available channels, to indicate equal or lower expected utility of the at least one superior channel than a channel of the other available channels having the next highest expected utility, when the amount of channel queries received from the secondary network during a given time span exceeds a first limit, and
      a communication unit that returns the adjusted channel quality metric value of the at least one superior channel, in response to at least one subsequent channel query from the secondary network, thereby influencing the secondary network to select a channel other than the at least one superior channel for radio communication to balance the load on the available channels.

12. The channel handling node according to claim 11, wherein the channel quality metric relates to at least one of: a maximum allowed transmit power, expected Signal to Interference and Noise Ratio SINR, expected Signal to Noise Ratio SNR, expected Bit Error Rate BER, expected Symbol Error Rate SER, and expected Block Error Rate BLER.

13. The channel handling node according to claim 11, wherein the logic unit adjusts the channel quality metric value to a location-specific value depending on a location given in the at least one subsequent channel query.

14. The channel handling node according to claim 11, wherein the adjusted channel quality metric value is valid for a certain time of day, week or season.

15. The channel handling node according to claim 11, wherein the communication unit receives the at least one subsequent channel query from any of: a network management node, a base station and a wireless device in the secondary network.

16. The channel handling node according to claim 11, wherein the communication unit returns an indicator with the adjusted channel quality metric value to indicate that the value has been adjusted.

17. The channel handling node according to claim 11, wherein the communication unit returns the determined channel quality metric value of the at least one superior channel with the adjusted channel quality metric value of the same channel.

18. The channel handling node according to claim 11, wherein the communication unit returns the determined channel quality metric value of the at least one superior channel with a relative quality metric value calculated by using a function of the determined channel quality metric value and the adjusted channel quality metric value of the same channel.

19. The channel handling node according to claim 11, wherein the logic unit adjusts the channel quality metric value of a specific channel, out of the available channels, based on the number of active wireless devices currently using that channel.

20. A method in a secondary network node of a secondary network, for selecting a channel for secondary usage by the secondary network for radio communication in a specific geographical area, characterized in that the method comprises:
   receiving values of a channel quality metric for the available channels from a channel handling node in response to a channel query, the channel quality metric values indicating expected utility when the channels are used for radio communication in the geographical area, wherein the channel quality metric value of at least one superior channel having a channel quality metric value that indicates higher expected utility than the channel quality metric values of the other available channels, has been adjusted by the channel handling node to indicate equal or lower expected utility of the at least one superior channel than a channel of the other available channels having the next highest expected utility when the amount of channel queries from the secondary network during a given time span exceeds a first limit, and
   selecting a channel for secondary usage by the secondary network based on the received channel quality metric values of the available channels.

21. The method according to claim 20, wherein an indicator is received with the adjusted channel quality metric value to indicate that the value has been adjusted, and a channel is selected for secondary usage further based on the indicator.

22. The method according to claim 20, wherein a non-adjusted channel quality metric value of the at least one superior channel is received with the adjusted channel quality metric value of the same channel, and a channel is selected for secondary usage further based on the non-adjusted channel quality metric value.

23. The method according to claim 20, wherein a non-adjusted channel quality metric value of the at least one superior channel is received with a relative quality metric value calculated by using a function of the determined channel quality metric value and the adjusted channel quality metric value of the same channel, and a channel is selected for secondary usage further based on the relative quality metric value.

24. A secondary network node of a secondary network, configured for selecting a channel for secondary usage by the secondary network for radio communication in a specific geographical area, characterized in that the secondary network node comprises:
   a receiving unit that receives values of a channel quality metric for the available channels from a channel handling node in response to a channel query, the channel quality metric values indicating expected utility when the channels are used for radio communication in the geographical area, wherein the channel quality metric value of at least one superior channel having a channel quality metric value that indicates higher expected utility than the channel quality metric values of the other available channels, has been adjusted by the channel handling node to indicate equal or lower expected utility of the at least one superior channel than a channel of the other available channels having the next highest expected utility when the amount of channel queries from the secondary network during a given time span exceeds a first limit, and a selecting unit that selects a channel for secondary usage by the secondary network based on the received channel quality metric values of the available channels.

25. The secondary network node according to claim 24, wherein an indicator is received with the adjusted channel quality metric value to indicate that the value has been adjusted, and the selecting unit selects channel for secondary usage further based on the indicator.

26. The secondary network node according to claim 24, wherein a non-adjusted channel quality metric value of the at least one superior channel is received with the adjusted channel quality metric value of the same channel, and the selecting unit selects a channel for secondary usage further based on the non-adjusted channel quality metric value.

27. The secondary network node according to claim 24, wherein a non-adjusted channel quality metric value of the at least one superior channel is received with a relative quality metric value calculated by using a function of the determined channel quality metric value and the adjusted channel quality metric value of the same channel, and the selecting unit selects a channel for secondary usage further based on the relative quality metric value.

* * * * *